(12) United States Patent
Tomberlin

(10) Patent No.: US 6,834,040 B2
(45) Date of Patent: Dec. 21, 2004

(54) MEASUREMENT SYNCHRONIZATION METHOD FOR VOICE OVER PACKET COMMUNICATION SYSTEMS

(75) Inventor: Jeffrey Tomberlin, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 851 days.

(21) Appl. No.: 09/784,428

(22) Filed: Feb. 15, 2001

(65) Prior Publication Data

US 2002/0110153 A1 Aug. 15, 2002

(51) Int. Cl.[7] ............................. H04L 7/00; H04J 3/06
(52) U.S. Cl. ...................................... 370/241; 370/503
(58) Field of Search ............................. 370/241, 252, 370/248, 503, 507; 375/358, 362, 365

(56) References Cited

U.S. PATENT DOCUMENTS 5,436,935 A * 7/1995 Bernhard et al. ........... 375/367
5,805,646 A * 9/1998 Wang ......................... 375/354
6,212,247 B1 * 4/2001 Olafsson ..................... 375/358

* cited by examiner

Primary Examiner—Hassan Kizou
Assistant Examiner—Hong Cho

(57) ABSTRACT

A method for synchronizing a measurement in a communication system. Recent developments in communication systems have resulted in combining the traffic historically carried separately by telephone and data networks. The service provided by such systems is referred to as Voice over Packet (VoP) with the more popular version using the Internet Protocol (IP) commonly referred to as Voice over IP (VoIP). VoP technologies have made maintaining voice quality at high levels more complex by compressing the voice signal and transmitting it in discrete packets. With voice traffic there is the need for timely packet delivery, often in networks that were not originally designed for these conditions. Digitizing analog voice signals often affects voice clarity. Objective tests for voice quality are available but are difficult to synchronize between stations. In methods disclosed pseudo-random analogue signals which emulate white noise are created and used as synchronization signals which enable this synchronization more precisely than previous methods. These signals are relatively unaffected by the codecs commonly used for voice and data compression.

16 Claims, 5 Drawing Sheets

MEASUREMENT SYNCHRONIZATION METHOD FOR VOICE OVER PACKET COMMUNICATION SYSTEMS

FIELD OF THE INVENTION

The present invention relates generally to communication systems such as telephone systems and, more particularly, to performance measurements, as for example voice clarity measurements, in such systems, and even more particularly to measurement synchronization between two stations in such systems, and specifically in voice over packet systems.

BACKGROUND OF THE INVENTION

Telephone companies have expended great efforts over many years to improve the quality of the voice communications that they have traditionally carried. Telephone systems operated by these companies are often referred to as public switched telephone network (PSTNs). While not perfect, voice quality in modem telephone systems has been improved by optimizing various system components for the dynamic range of the human voice and the rhythms of human conversation to the point that they can provide high quality service. High quality voice traffic does not require a large bandwidth but does require timely transmission.

Unlike PSTNs, however, networks which transmit data in discrete packets, such as those that use the Internet Protocol (IP), were developed to support non-real-time applications, such as file transfers and e-mail. These applications feature communication traffic that is bursty and typically requires much higher bandwidths than voice traffic does but is not as sensitive to delays and delay variations as PSTNs are. In addition, such network applications can compensate for packet loss by re-transmitting any lost packets, and the reception of data packets out of order does not present significant problems in data reconstruction.

Recent developments in communication systems have resulted in combining the traffic historically carried separately by telephone and data networks. The service provided by such systems is referred to as Voice over Packet (VoP). The more popular of VoP systems utilize the Internet Protocol (IP) and are commonly referred to as Voice over IP (VoIP) systems. VoP technologies have made maintaining voice quality at high levels more complex by compressing the voice signal and transmitting it in discrete packets. With voice traffic there is the need for timely packet delivery, often in networks that were not originally designed for these conditions. Transmission conditions that pose little threat to non-real-time data traffic can introduce severe problems to real-time packetized voice traffic. These conditions include real-time message delivery, gateway processes, packet loss, packet delay, and the utilization of nonlinear codecs.

Newer PSTN networks use digital-voice transmission for greater efficiency in their backbones. Digitizing analog voice signals often affects voice clarity. The VoIP gateway interconnects the PSTN with the IP network using voice and signaling schemes.

Voice quality as perceived by the user is subjective, but typically his perception of quality includes three key parameters: (1) signal clarity, (2) transmission delays, and (3) signal echos. While the impact on the user is subjective in nature, objective measurement techniques for each of these parameters has been developed. The clarity of a voice signal is generally described by how accurately the received signal reproduces that which was sent. Signal fidelity, lack of distortion, and intelligibility are key elements in the description of its clarity. Delay is the time that it takes to transmit a voice signal from the speaker to the listener. And, echo is the sound of the speaker's voice that he hears returning to him. Delay and echo can be annoyances and distractions to the user. Any delays in transmission and any echos should be imperceptible to him. A lack of clarity can also degrade the ability of the user to obtain information from the interchange and heighten the level of his frustration.

Packet loss is not uncommon in IP networks. As the network, or even some of its links become congested, router buffers fill and start to drop packets. Another cause of packet loss is route changes due to inoperative network links. An effect similar to packet loss occurs when a packet experiences a large delay in the network and arrives too late for use in reconstructing the voice signal. In the case of real-time voice information, packets must arrive within a relatively narrow time window to be useful in reconstructing the voice signal. Re-transmissions in the case of voice may add extensive delay to the reconstruction and cause clipping, or unintelligible speech.

Voice transmission in a VoP system are coded and decoded via a codec. A speech codec is a device which transforms analog voice into digital bit streams and vice versa. The term codec is a shortened form of coder/decoder. Some speech codecs also use compression techniques which remove less important parts of the signal in order to reduce the bandwidth required for the transmission. In other words, many codecs compress voice signals by preserving only those parts of the voice signal that are perceptually important.

The signal can experience delays from the time it takes for the system or network to digitize, form data packets, transmit, route, and buffer a voice signal. These delays can interfere with normal conversations.

Since users have become accustomed to PSTN levels of voice quality and compare the voice quality of other services to that typically obtained from a PSTN, for VoP services to be acceptable they must maintain this level of quality. Voice quality is now an important differentiating factor for VoP (voice-over-packet) networks and equipment. Consequently, measuring voice quality in a relatively inexpensive, reliable, and objective way has become very important.

One industry standard, objective method for measuring clarity in VoP networks is the perceptual speech-quality measurement (PSQM). PSQM evaluates the quality of voice signals in the same way that codecs encode and decode voice signals. PSQM evaluates whether a voice signal is distorted enough for a human to find it annoying and distracting. It compares a clean voice sample with a distorted version using a complex weighting method that takes into account perceptually important elements, such as the physiology of the human ear and cognitive factors related to what human listeners are likely to notice. PSQM uses an algorithm to provide a relative score that indicates just how different the distorted signal is from the original from the human listener's perspective. This distortion score corresponds closely to how a statistically large number of human listeners would react in the same test situation using.

Another important method for measuring perceived clarity is the PAMS (perceptual analysis-measurement system). PAMS uses a perceptual model similar to that of PSQM and provides a repeatable, objective means of measuring perceived voice quality. PAMS uses a different but effective signal-processing model and produces different types of scores.

One difficulty in performing either the PSQM or PAMS test is the synchronization of the original and received messages. Typically the user must press the Start button on the receiving station prior to pressing the start button on the transmitting station. The receiving station then must record for a period of time longer than that of the message that was sent. During the analysis phase which follows the recording phase the recorded message is compared to that of the original message. To obtain a meaningful measurement these two signals must be correlated in time, i.e., the recorded file must be scanned to locate the PSQM/PAMS signal. This correlation can be very expensive in terms of computational resources consumed. In addition, the requirement of activating the recording by the receiving station prior to that of the transmitting station makes automatic measurements difficult.

The disadvantages of this synchronization scheme include (1) it puts burden on the user to synchronize test, (2) it cannot realistically be scheduled to run at preselected times, (3) PSQM signal correlation will be very slow, perhaps taking on the order of 1–2 minutes per test, (4) the level of synchronization obtained is inconsistent and operator dependent, and (5) PSQM/PAMS Trend measurements are not possible.

An alternate method is to use a separate network from that of the communication channel under test for the synchronization signals. However, these separate links are often not available to the user. Transmissions such as these are referred to as out-of-band transmissions. While transmissions within the same network are referred to as being in band.

Thus, there exists a need for a synchronization scheme which (1) permits the transmitting and receiving stations to be activated in any order, (2) provides for accurate synchronization between the transmitted and recorded signals, (3) can be automatically activated at preselected times, and (4) does not require operator activation with its inherent timing inaccuracies.

SUMMARY OF THE INVENTION

In representative embodiments, methods for synchronizing measurements in communication systems are disclosed. Recent developments in communication systems have resulted in combining the traffic historically carried separately by telephone and data networks. The service provided by such systems is referred to as Voice over Packet (VoP) with the more popular version using the Internet Protocol (IP) commonly referred to as Voice over IP (VoIP). VoP technologies have made maintaining voice quality at high levels more complex by compressing the digitized voice signal and transmitting it in discrete packets. With voice traffic there is the need for timely packet delivery, often in networks that were not originally designed for these conditions. Digitizing analog voice signals often affects voice clarity. Clarity is also affected if packets arrive out of order or are lost.

Voice over Packet systems are advantageous in that they can carry more traffic over the same number of lines than was possible in traditional telephone systems. Further, it is no longer necessary to dedicate specific lines in the network backbone for each connection. Traffic can now take any of many routes through the network and many conversations may share the typically large band-width lines in the network backbone. The advantage of such systems is the more efficient transport of information. The communications that take place in these systems are less noisy than conventional all analogue systems due to the fact that digital rather than analogue data are being transported across the network backbone. Disadvantages include uncertain delays since the messages sent back and forth can take different routes at different times and, therefore, can experience different delays at different times. Once established, however, a route through the network tends to remain the same unless something catastrophic occurs, as for example the failure of a system router or other critical system component.

Objective tests for voice quality are available but are difficult to synchronize between stations. These tests involve the transmission of a test signal from a first communication station to another. Commercially available voice quality testers (VQT) are placed at each communication station. A first one transmits the test signal while a second one records it as it arrives at its location. The recorded signal is then compared to a copy of the message originally transmitted. Aligning these two signals in time can be difficult and time consuming. In methods disclosed in the present patent document, pseudo-random analogue signals which emulate white noise are created and used as synchronization signals which enable this synchronization more precisely than previous methods. These signals are relatively unaffected by the codecs commonly used in communication systems for signal compression.

Difficulties arise in the determination of the exact point in the recorded signal to begin comparison with the copy of the original test signal. In order to make this determination, the two signals must be examined in a time and resource consuming process. Methods for more efficient synchronization of these two signals, i.e., the signal received and recorded by the recorder at the second communication station and the copy of the original test signal maintained by the second voice quality tester, are disclosed herein.

Prior to initiating the steps leading to the measurement of voice quality, both testers must be attached to the two communication stations and turned on. A recorder is activated at the second communication station and the test signal transmitted from the first communication station at times relative to each other based upon synchronization signals passing between.

A first synchronization signal is transmitted by the first voice quality tester. The first synchronization signal is received by the second voice quality tester. Then a second synchronization signal is transmitted by the second voice quality tester. The second synchronization signal is in turn received by the first voice quality tester.

Relative to the time that the second synchronization signal is received at the first communication station, a test signal is transmitted by the first voice quality tester. The recorder is placed in record mode relative to the time that the first synchronization signal is received at the second communication station. This time is set early enough to ensure that it is in record mode prior to the arrival of the test signal. The recorder is left in record mode long enough to ensure that it records all of the test signal.

Alternative embodiments apply successive repetitions of the first and second synchronization signals. Repeating these synchronization signals provide the opportunity for the system to measure the time delays in the system and adjust recorder initiation accordingly and to make appropriate adjustments for jitter, etc. so that the best quality signal can be obtained. The repeated synchronization signals should be of various durations that differ from previous signals such that if a signal is missed or if an echo from an earlier signal is received and is strong enough to be mistaken as a synchronization signal, the system will detect this situation and restart the test. A reasonable choice is to generate a second pair of first and second synchronization signals. Timing of the placement of the recorder in record mode and the transmission of the test signal is then relative to the second pair of first and second synchronization signals. The choice as to the number of repeated synchronization signals is a trade off between more precisely identifying the time delays involved in the transmission of messages between first and second communication stations on the one hand and excessive test times on the other.

Waveforms for synchronization signals other than the pseudo-random chosen are possible. However, it is relatively easy to confirm that a pseudo-random waveform has been received by measuring its intensity. A constant signal level over any arbitrary period of time is expected for the pseudo-random waveform. In representative embodiments, the signal is examined for different time periods in order to confirm that the same signal level is obtained for both time periods. In addition, codecs do not distort pseudo-random signals as they would pure sine waves as would be found in for example the signaling tones typically found in telephone systems, i.e., the dual tone multi-frequency (DTMF) tones. Typically any distortion which would be added to the pseudo-random waveform would not change the waveform. The "white noise" into the system would be received as substantially unchanged "white noise".

While the pseudo-random signal generated appears to be random, it is in fact a completely predetermined waveform. As such, correlation down to the bit level could be obtained between the received test signal and the copy of the test signal. This degree of precision, while available, is typically not required for applications such as that described herein.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

Figure 1:
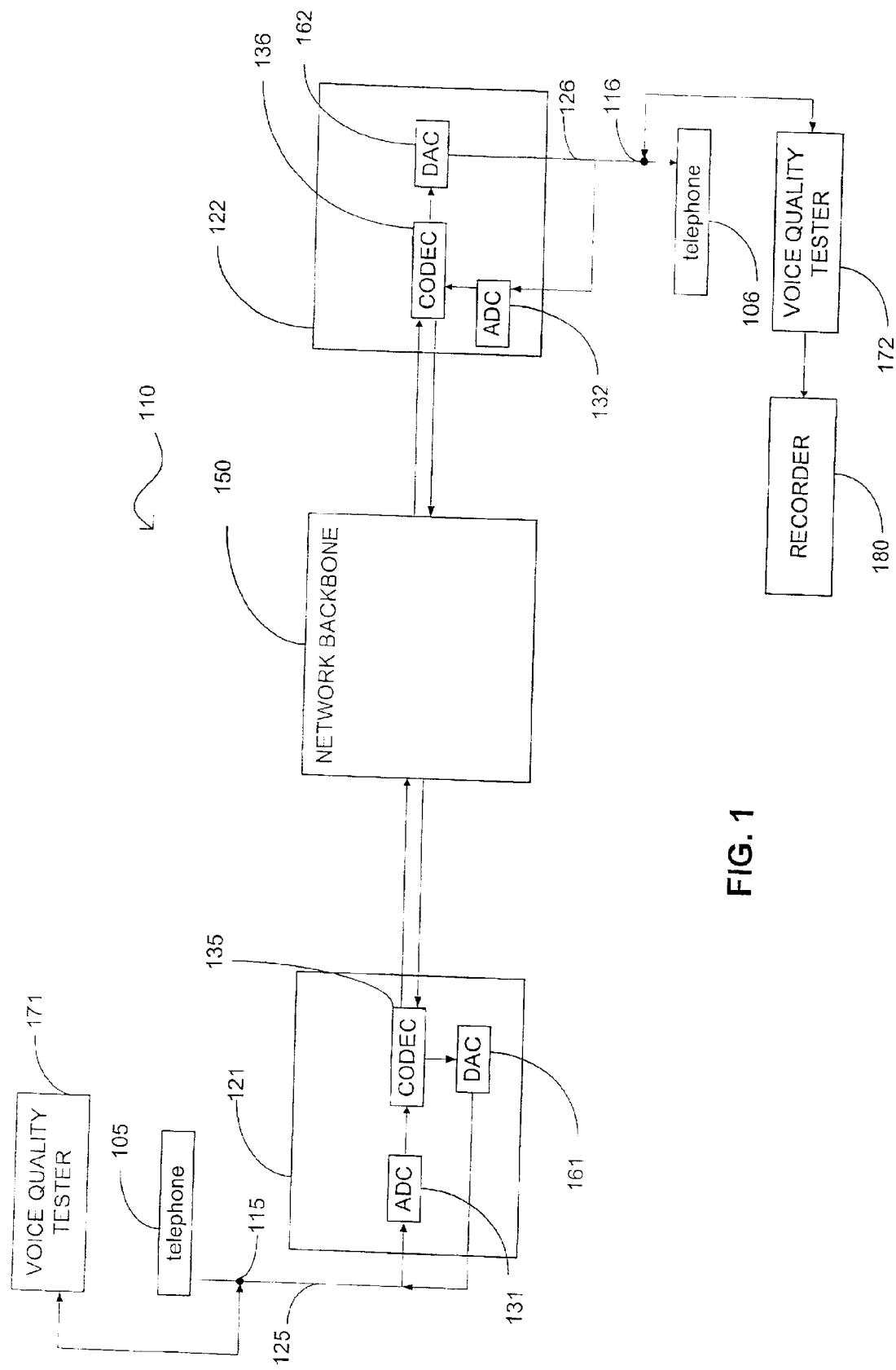
FIG. 1 is a drawing of a communication system as described in various representative embodiments of the present patent document.

As shown in the drawings for purposes of illustration, the present patent document relates to a novel method for synchronizing a measurement in a communication system, as for example in a telephone system using Voice over Packet (VoP) technology and in the more popular form of VoP that utilizes the Internet Protocol (IP) and commonly referred to as Voice over IP (VoIP). Previous methods for synchronization of measurements between two stations have relied upon operators at the two stations manually starting their separate processes at the command of one of the operators. This technique results in transmitted and recorded measurements which are often time and resource consuming to synchronize. In the following detailed description and in the several figures of the drawings, like elements are identified with like reference numerals.

FIG. 1 is a drawing of a communication system as described in various representative embodiments of the present patent document. In the representative embodiment of FIG. 1, the communication system is telephone system which utilizes Voice over Packet (VoP) technology in its more popular form the Internet Protocol (IP) and commonly referred to as Voice over IP (VoIP). A first communication station 105, which in this example is first telephone 105, is connected to a communication link 110 at a first connection point 115, and a second communication station 106, which in this example is second telephone 106, is connected to the communication link 110 at a second connection point 116.

Voice and other signals from the first communication station 105 are carried to a first gateway 121, typically located in the telephone system switching office, via a first dedicated communication line 125. The first dedicated communication line 125 carries traffic in both directions between the first communication station 105 and the first gateway 121. After an analogue signal, which could be a voice signal, is transmitted by the first communication station 105 and received at the first gateway 121, it is converted to a digital signal by a first analogue-to-digital converter (ADC) 131, sent through a first codec 135 which compresses the signal, and then transported over a network backbone 150 to a second gateway 122. The signal then takes any number of possible physical paths through the network backbone 150 until it arrives at the second gateway 122. At the second gateway 122, the voice data is uncompressed by a second codec 136 and then transformed from digital to analogue data by a second digital-to-analogue converter (DAC) 162. The analogue voice signal is now carried to the second communication station 106 via a second dedicated communication line 126. Signals may also pass through other system components not shown in FIG. 1, as for example jitter buffers which are intended to smooth the flow of the signal.

Traffic from the second communication station 106 to the first communication station 105 follow a similar, but reverse route. In this case, however, a voice or data transmission from the second telephone 106 is first converted to a digital signal by a second analogue-to-digital converter 132 before being compressed by the second codes 136, and in the second gateway, the signal from the first codes 135 is converted to an analogue signal by a first digital-to-analogue converter (DAC) 161.

Signals from the second communication station 106 are carried to the second gateway 122, typically located in the telephone system switching office, via the second dedicated communication line 126. The second dedicated communication line 126 carries traffic in both directions between the second communication station 106 and the second gateway 122. After the analogue signal is transmitted by the second communication station 106, it is converted to a digital signal by the second analogue-to-digital converter (ADC) 132, sent through the second codec 136 which compresses the data in the signal, and then transported over the network backbone 150 to the first gateway 121. The signal then takes any number of possible physical paths through the network backbone 150 until it arrives at the first gateway 121. In the first gateway 121, the voice data is uncompressed by the first codec 135 and then transformed from digital to analogue data by the first digital-to-analogue converter (DAC) 161. The analogue voice signal is now carried to the first communication station 105 via the first dedicated communication line 125.

The Voice over Packet system just described has advantages in having the capability of carrying more traffic over the same number of lines than was possible in traditional telephone systems. Further, it is no longer necessary to dedicate specific lines in the network backbone 150 for each connection. Traffic can now take any of many routes through the network 150 and many conversations may share the typically large band-width lines in the network backbone 150. The advantage of such a system is the more efficient transport of information. The communications that take place in such systems are less noisy than conventional all analogue systems due to the fact that digital rather than analogue data are being transported across the network backbone 150. Disadvantages include uncertain delays since the messages sent back and forth can take different routes at different times and, therefore, can experience different delays at different times. Once established, however, a route through the network 150 tends to remain the same unless something catastrophic occurs, as for example the failure of a system router or other critical system component.

In order to test the quality of voice traffic through the communication link 110, a first voice quality tester (VQT) 171 is connected to the communication link 110 at the first connection point 115 and a second voice quality tester (VQT) 172 is connected to the communication link 110 at the second connection point 116. Voice quality can only be assessed if both ends of the connection are evaluated at the same time. As previously indicated, in order to test for voice clarity across the network, a test signal is sent across the communication link 110 by the first communication system 105, but more specifically by the first voice quality tester 171 at the first connection point 115, and recorded upon reception at the second connection point 116 by a recorder 180 which may be a part of or attached to the second voice quality tester 172. To perform a voice quality test, it has typically been necessary to perform in order the following tasks: (1) turn on both voice quality testers 171,172, (2) activate the recorder 180 at the second communication station 106, (3) initiate transmission of the test signal at the first communication station 107, (4) record the signal as received at the second communication station 106, and finally (5) turn off the recorder 180. The recorder must to be left on long enough to capture the complete test signal in order for the test to be accurate. The second voice quality tester 172 maintains an exact copy of the test signal that the first voice quality tester 171 transmitted. After the full test signal received at the second communication station 106 has been recorded by the recorder 180, the recorded copy is compared to the copy kept by the second voice quality tester 172. Deviations between the recorded and the original provide an objective measure of the voice clarity of the communication link 110 between first and second communication stations 105,106. Difficulties arise in the determination of the exact point in the recorded signal to begin comparison with the copy of the original test signal. In order to make this determination, the two signals must be examined in a time and resource consuming process. Methods for more efficient synchronization of these two signals, the signal received and recorded by the recorder 180 at the second communication station 106 and the copy of the original test signal maintained by the second voice quality tester 172, are disclosed herein.

Figure 2:
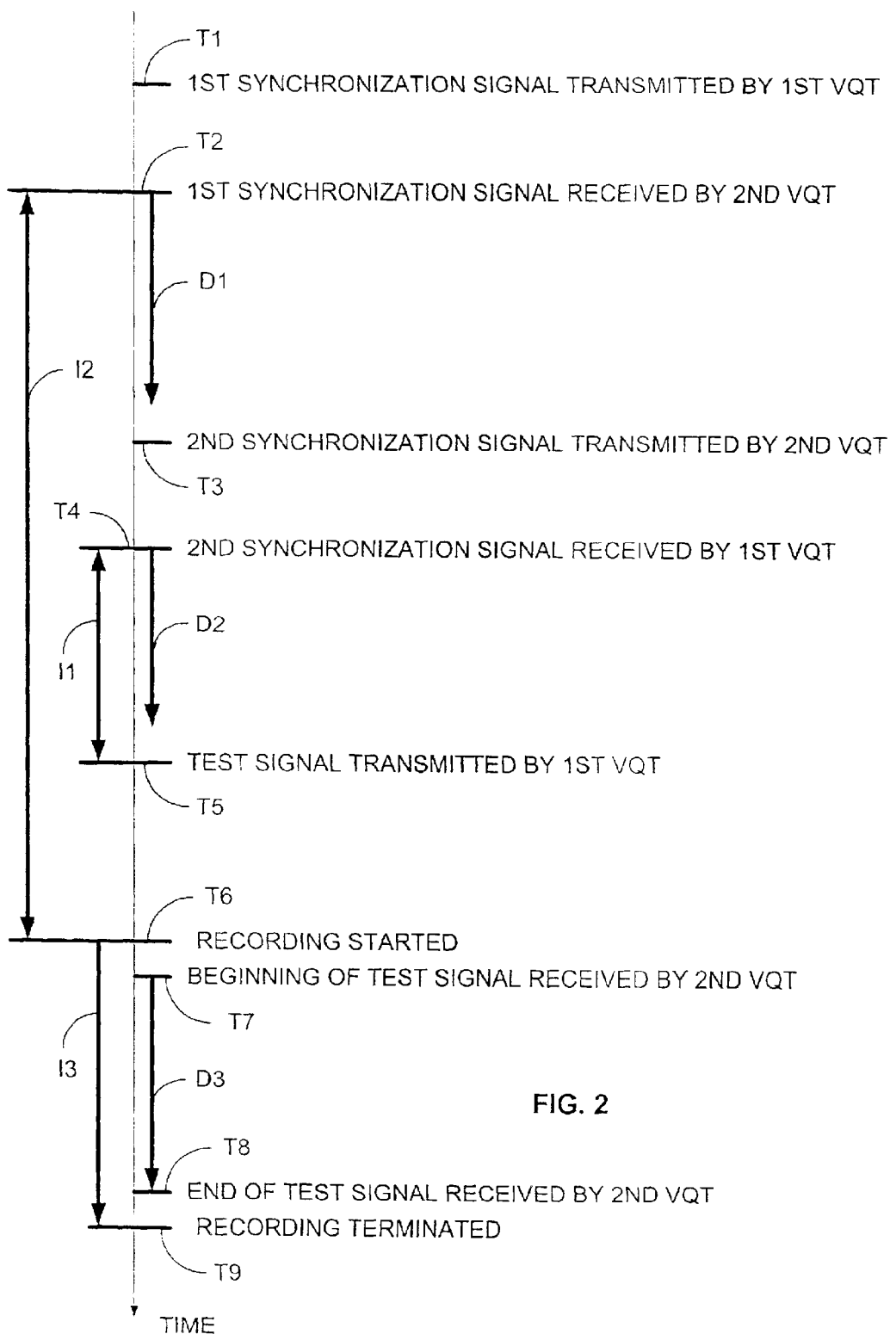
FIG. 2 is a drawing of a time line for synchronizing a measurement in the communication system as described in various representative embodiments of the present patent document.

FIG. 2 is a drawing of a time line 200 for synchronizing a measurement in the communication system as described in various representative embodiments of the present patent document. Prior to initiating the steps leading to the time line 200 of FIG. 2, both voice quality testers 171,172 must be attached to the communication stations 105,106 and turned on. The recorder 180 is activated at the second communication station 106 and the test signal transmitted from the first communication station 105 at times relative to each other based upon synchronization signals passing between them as will now be described.

At time T1, a first synchronization signal is transmitted by the first voice quality tester 171. The first synchronization signal is received by the second voice quality tester 172 at time T2. The first synchronization signal has a first duration D1. At time T3, a second synchronization signal is transmitted by the second voice quality tester 172. The second synchronization signal is received by the first voice quality tester 171 at time T4. The second synchronization signal has a second duration D2.

At time T5, a test signal is transmitted by the first voice quality tester 171. Time T5 occurs at a first time interval I1 after time T4 which is the time that the second synchronization signal was received by the first voice quality tester 171. The recorder 180 is placed in record mode at time T6 which occurs at a second time interval I2 after time T2 which is the time that the first synchronization signal is received by the second voice quality tester 172.

Alternative embodiments to that shown in FIG. 2 successively repeat transmission of the first and second synchronization signals. Repeating these synchronization signals provide the opportunity for the system to measure the time delays in the system and adjust recorder 180 initiation accordingly and to make appropriate adjustments for jitter, etc. so that the best quality signal can be obtained. The repeated synchronization signals should be of various durations that differ from previous signals such that if a signal is missed or if an echo from an earlier signal is received and is strong enough to be mistaken as a synchronization signal, the system will detect this situation and restart the test. A reasonable choice is to generate a second first synchronization signal and a second second synchronization signal measuring first and second time intervals I1,I2 from times T4,T2 respectively corresponding to the second first and second synchronization signals. The choice as to the number of repeated synchronization signals is a trade off between more precisely identifying the time delays involved in the transmission of messages between first and second communication stations 105,106 on the one hand and excessive test times on the other.

At time T7, the leading edge of the test signal is received by the second voice quality tester 172 and is recorded by the recorder 180. At time T8, the trailing edge of the test signal arrives at the second communication station 106, and at time T9, the recording is terminated. The received test signal duration D3 is the difference between times T8 and T7. Time T9 occurs at a third time interval I3 after time T6 which is the time that the recorder 180 is placed in record mode. The relative times shown in FIG. 2 are for illustrative purposes only.

Figure 3:
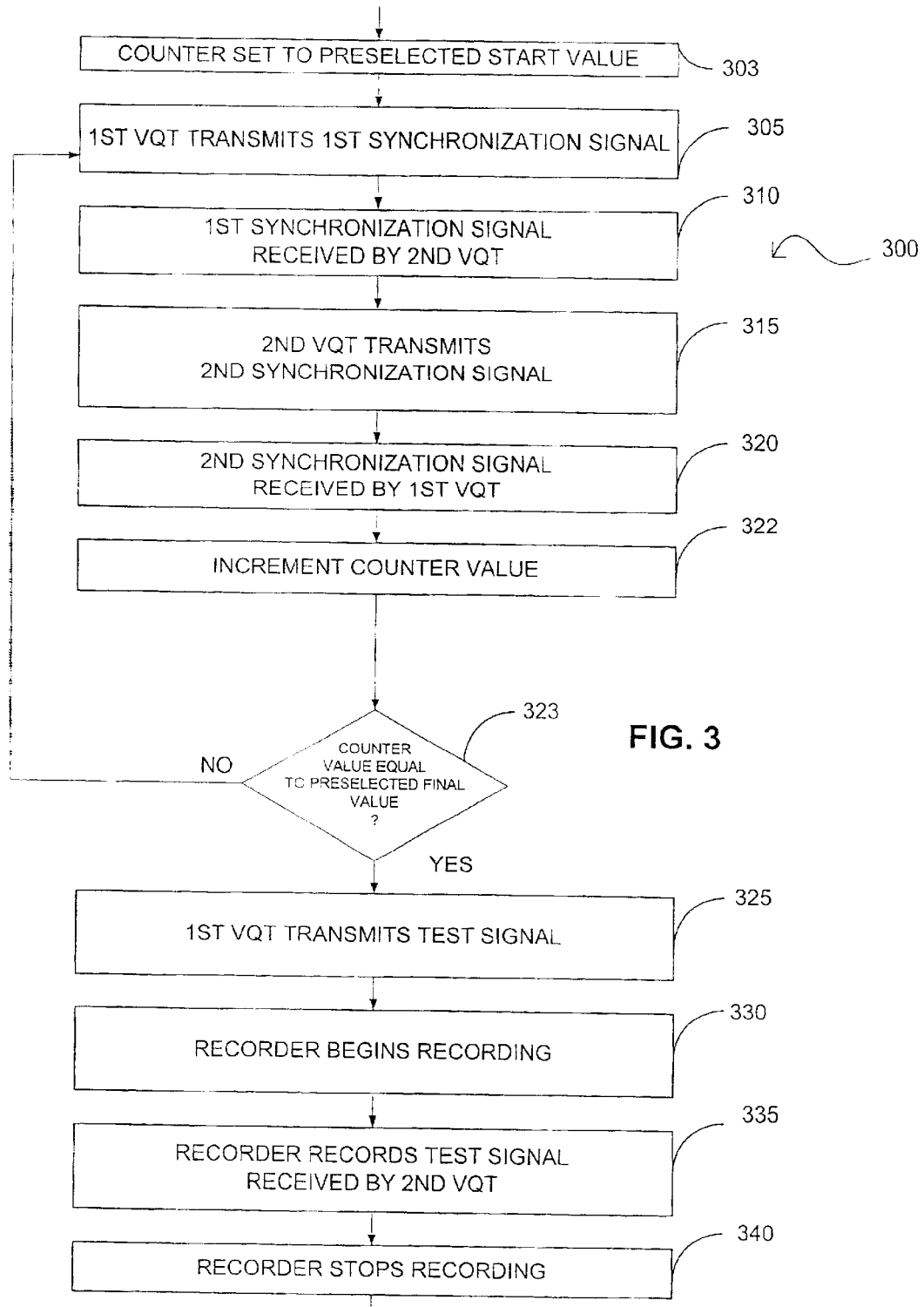
FIG. 3 is a flow chart of a method for synchronizing a measurement in the communication system as described in various representative embodiments of the present patent document.

FIG. 3 is a flow chart of a method 300 for synchronizing a measurement in the communication system as described in various representative embodiments of the present patent document. Once again, prior to initiating the steps leading to the time line 200 of FIG. 2 and the method steps of FIG. 3, both voice quality testers 171,172 must be attached to the communication stations 105,106 and turned on. The recorder 180 is activated at the second communication station 106 and the test signal transmitted from the first communication station 105 at times relative to each other based upon synchronization signals passing between them as will now be described in terms of the method steps of FIG. 3.

When the user is ready to perform a voice clarity test, a counter is set to a preselected start value in block 303. Block 303 then transfers control to block 305.

In block 305, the first voice quality tester 171 located with the first communication station 105 transmits a first synchronization signal. Block 305 then transfers control to block 310.

In block 310, the first synchronization signal is received by the second voice quality tester 172 located at the second communication station 106. Block 310 then transfers control to block 315.

In block 315, the second voice quality tester 172 transmits a second synchronization signal. Block 315 then transfers control to block 320.

In block 320, the second synchronization signal is received by the first voice quality tester 171 located at the first communication station 105. Block 320 then transfers control to block 322.

In block 322, the value in the counter is incremented. Block 322 then transfers control to block 323.

When the value in the counter is equal to a preselected final value, block 323 transfers control to block 325. Otherwise, block 323 transfers control to block 305 thus effecting the repeat of blocks 305 through 323.

In block 325, the test signal is transmitted by the first voice quality tester 171 located at the first communication station 105 at the first preselected time interval I1 following reception of the second synchronization signal by the first voice quality tester 171. Block 325 then transfers control to block 330.

In block 330, the recorder 180 begins recording at the second preselected time interval 12 following reception of the first synchronization signal by the second voice quality tester 172 located at the second communication station 106. The recorder 180 has capability of recording signals received at the second communication station 106. Block 330, then transfers control to block 335.

In block 335, the recorder 180 located with the second voice quality tester 172 at the second communication station 106 records the test signal that it receives after the test signal has traversed the communications link 110. Block 335, then transfers control to block 340.

In block 340, the recorder 180 is deactivated. At this point a correlation algorithm can be initiated to correlate the timing of a copy of the test signal which the second voice quality tester 172 maintains and the recorded copy of the test signal which traversed the communications link 110. The purpose of the correlation is to adjust the relative timing of the recorded copy of the test signal received by the second voice quality tester 172 to match that of the copy of the original test signal maintained by the second voice quality tester 172.

Figure 4:
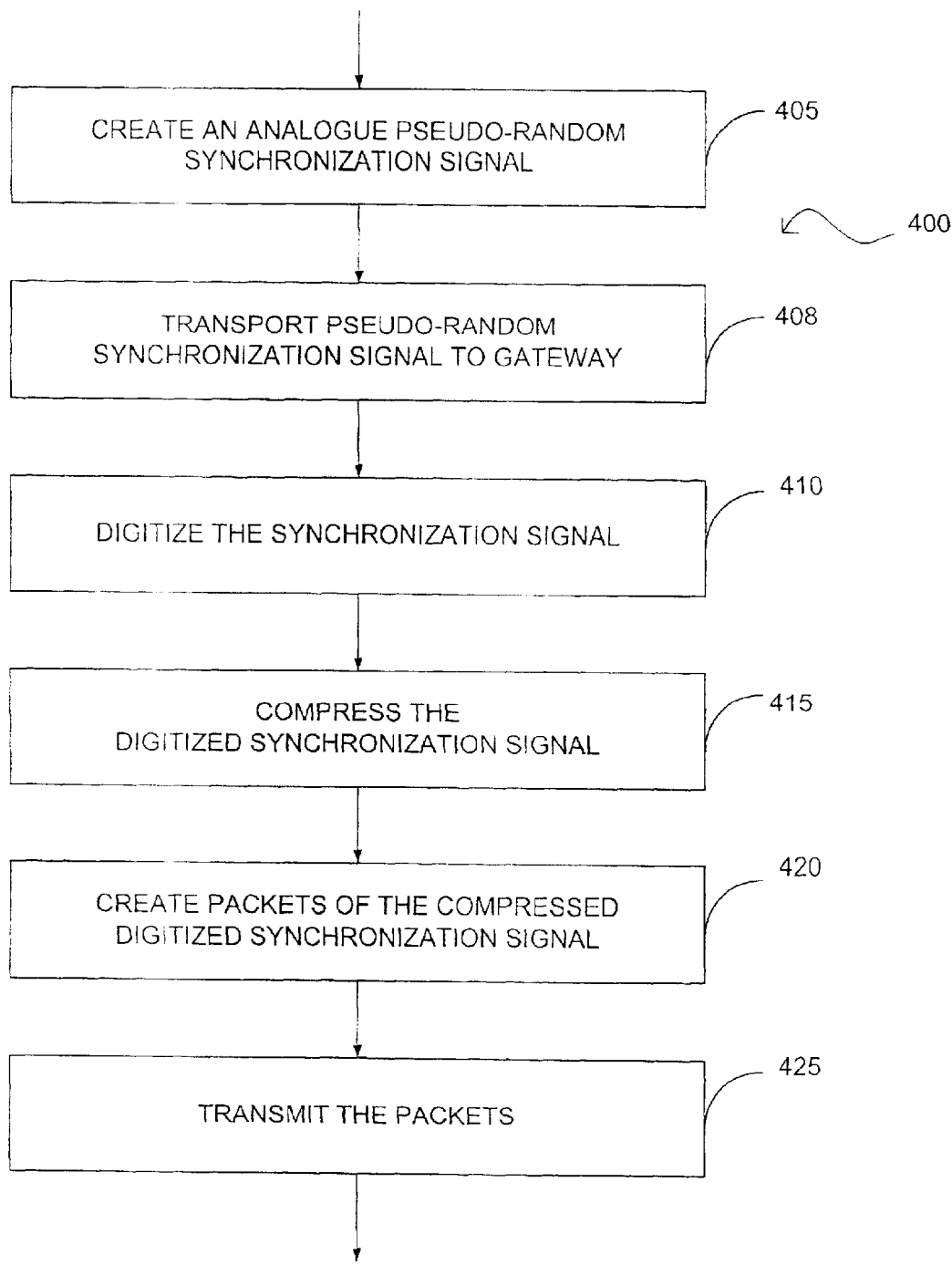
FIG. 4 is a flow chart of a portion of the method for synchronizing a measurement in the communication system as described in various representative embodiments of the present patent document.

FIG. 4 is a flow chart of a portion 400 of the method for synchronizing a measurement in the communication system as described in various representative embodiments of the present patent document. FIG. 4 shows in more detail the method steps that would comprise blocks 305 and 315 of FIG. 3.

In block 405, a pseudo-random analogue signal is created which will be used as the synchronization signal. While true white noise could be used as the synchronization signal, a more practical process is to generate the signal using for example the maximum length sequence (MLS) algorithm which is well known in the art. This algorithm generates all possible sequences of one's and zero's in a bit stream of predefined length and arranged in such an order that the resultant combination appears to be white noise. A combination such as this which appears to be random but which in fact is not is referred to herein as pseudo-random. Block 405 then transfers control to block 408.

In block 408, the synchronization signal is transported from its origination, as for example the voice quality tester 171, to its gateway, as for example the first gateway 121. Block 408 then transfers control to block 410.

In block 410, the synchronization signal is digitized. Periodic sampling of the first synchronization signal generated by the first voice quality tester 171 enables the first analogue-to-digital converter 131 to digitize the first synchronization signal. Block 410 then transfers control to block 415.

In block 415, the digitized synchronization signal is compressed. Compression could be effected by for example the first and second codec's 135,136 shown in FIG. 1. Block 415 then transfers control to block 420.

In block 420, transmission packets as for example in an IP network are created from the compressed digitized synchronization signal. Block 420 then transfers control to block 425.

In block 425, individual packets of segments of the compressed digitized synchronization signal are transmitted via the network backbone 150.

Figure 5:
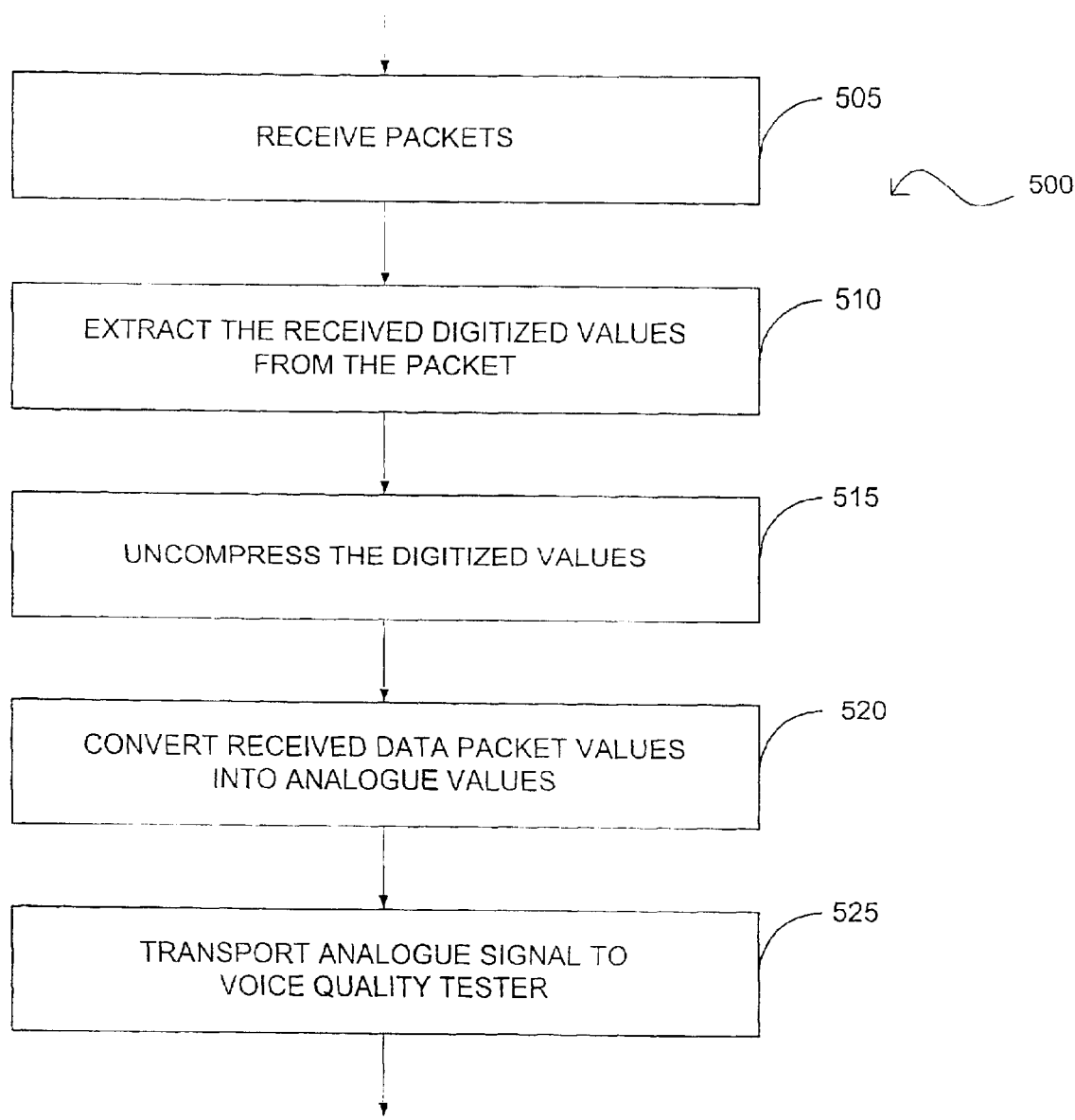
FIG. 5 is a flow chart of yet another portion of the method for synchronizing a measurement in the communication system as described in various representative embodiments of the present patent document.

FIG. 5 is a flow chart of yet another portion 500 of the method for synchronizing a measurement in the communication system as described in various representative embodiments of the present patent document. FIG. 5 shows in more detail the method steps that would comprise blocks 310 and 320 of FIG. 3.

In block 505, data packets of the synchronization signal are received at a system gateway, as for example the second gateway 122. Block 505 then transfers control to block 510.

Inblock 510, digitized values of the synchronization signal are extracted from the data packets. Block 510 then transfers control to block 515.

In block 515, the digitized values are uncompressed. Block 515 then transfers control to block 520.

In block 520, the uncompressed digitized values are converted into analogue values, as for example by the second digital-to-analogue converter 162 shown in FIG. 1. Block 520 then transfers control to block 525.

In block 520, the reconstituted analogue synchronization signal is transported from its destination gateway, as for example second gateway 122, to its final destination, as for example the second voice quality tester 172.

It is noted that the embodiments described herein are representative and that in any given embodiment not all of the method steps may be required or desirable. As for example, if the test were to be conducted from gateway to gateway, transmission of the synchronization and test signals between the first and second communication stations 105,106 and the first and second gateways 121,122 would not be necessary.

Waveforms for synchronization signals other than the pseudo-random chosen are possible. However, it is relatively easy to confirm that a pseudo-random waveform has been received by measuring its intensity. A constant signal level over any arbitrary period of time is expected for the pseudo-random waveform. In representative embodiments, the signal is examined for different time periods in order to confirm that the same signal level is obtained for both time periods. In addition, codecs do not distort pseudo-random signals as they would pure sine waves as would be found in for example the signaling tones typically found in telephone systems, i.e., the dual tone multi-frequency (DTMF) tones. Typically any distortion which would be added to the pseudo-random waveform would not change the waveform. The "white noise" into the system would be received as substantially unchanged "white noise".

While the pseudo-random signal generated appears to be random, it is in fact a completely predetermined waveform. As such, correlation down to the bit level could be obtained between the received test signal and the copy of the test signal. This degree of precision, while available, is typically not required for applications such as that described herein.

As is the case, in many data-processing products, the various methods steps disclosed herein may be implemented by means of software procedures, in hardware, or as a combination of hardware and software components. Moreover, all or part of the functionality required for using the invention may be embodied in computer-readable media, such as a computer hard disk, computer random access memory (RAM), compact disks (CDs), or as 3.5 inch diskettes, to be used in programming an information-processing apparatus, as for example a personal computer or dedicated tester which could be for example the Agilent Telegra R Voice Quality Tester comprising part or all of the abilities previously described to perform in accordance with the invention.

Primary advantages of the embodiments as described in the present patent document over prior methods for synchronizing measurements in communication systems, as for example in a clarity measurements, is that codecs do not tend to distort the waveform, the waveform is easily generated, and it is easily confirmed to be the expected waveform. Repeating the synchronization signals provides a means for allowing the voice quality testers 171,172 to identify delay times in the system and to adjust the time delays that they use in sending and initiating the recording of the received test signal. In addition, the present methods do not rely upon coordination of critical timing events between two users at separate locations. All synchronization signals are transmitted in-band utilizing the same path as the test signal.

While the present invention has been described in detail in relation to preferred embodiments thereof, the described embodiments has been presented by way of example and not by way of limitation. It will be understood by those skilled in the art that various changes may be made in the form and details of the described embodiments resulting in equivalent embodiments that remain within the scope of the appended claims.

What is claimed is:

1. A method for synchronizing a measurement in a communication system, which comprises the steps of:

setting a counter to a preselected start value;
while the value in the counter is not equal to a preselected final value,
at a first connection point of a communication link, transmitting a first synchronization signal;
at a second connection point of the communication link, receiving the first synchronization signal;
at the second connection point, transmitting a second synchronization signal;
at the first connection point, receiving the second synchronization signal; and
incrementing the value in the counter;
otherwise,
transmitting a test signal at the first connection point when time equals the reception time of the last transmitted second synchronization signal at the first connection point plus a first
preselected time interval;
recording transmissions arriving at the second connection point beginning when time equals the reception time of the last transmitted first synchronization signal at the second connection point plus a second preselected time interval; and
ceasing to record transmissions arriving at the second connection point beginning when time equals the reception time of the last transmitted first synchronization signal at the second connection point plus a third preselected time interval.

2. The method as recited in claim 1, providing the first synchronization signal, second synchronization signal, and the test signal are transmitted as a series of digitized data packets.

3. The method as recited in claim 1, providing at least one of the synchronization signals has a waveform selected from the group consisting of a pseudo-random pattern and white noise.

4. The method as recited in claim 3, providing the pseudo-random waveform is generated via a maximum length sequence (MLS) algorithm.

5. The method as recited in claim 1, providing the communication system is a telephone system.

6. The method as recited in claim 1, providing signals are transmitted using voice over packet technology.

7. The method as recited in claim 6, providing the voice over packet technology is the voice over Internet Protocol technology.

8. The method as recited in claim 1, providing at least one synchronization signal has a duration different from at least one other synchronization signal.

9. The method as recited in claim 1, providing all first synchronization signals have duration different from all other first synchronization signals.

10. The method as recited in claim 1, providing all second synchronization signals have duration different from all other second synchronization signals.

11. The method as recited in claim 1, providing all first synchronization signals have duration different from all second synchronization signals.

12. The method as recited in claim 1, providing that the counter preselected start value and the counter preselected final value are such that the number of first synchronization signals transmitted is a number selected from the group consisting of 1, 2, 3, 4, 5, 6, 7, 8, 9, and 10.

13. The method as recited in claim 1, wherein the method step transmitting the first synchronization signal further comprises the steps of:

at preselected instances within the duration of the first synchronization signal, measuring a value of the first synchronization signal;

digitizing the measured value of the first synchronization signal;

creating a first synchronization signal data packet comprising the digitized measured value of the first synchronization signal and transmitting the first synchronization signal data packet.

14. The method as recited in claim 1, wherein the method step transmitting the second synchronization signal further comprises the steps of:

at preselected instances within the duration of the second synchronization signal, measuring a value of the second synchronization signal;

digitizing the measured value of the second synchronization signal;

creating a second synchronization signal data packet comprising the digitized measured value of the second synchronization signal; and transmitting the second synchronization signal data packet.

15. The method as recited in claim 1, wherein the method step receiving the first synchronization signal further comprises the steps of:

when at least one data packet is detected at the second connection point, receiving the data packet;

extracting a received data packet value from the received data packet; and converting the received data packet value to an analogue signal value.

16. The method as recited in claim 1, wherein the method step receiving the second synchronization signal further comprises the steps of:

when at least one data packet is detected at the first connection point, receiving the data packet;

extracting a received data packet value from the received data packet; and converting the received data packet value to an analogue signal value.

* * * * *